(12) United States Patent
Pyshos et al.

(10) Patent No.: US 12,435,860 B2
(45) Date of Patent: Oct. 7, 2025

(54) CONFIGURABLE LIGHTING SYSTEM

(71) Applicant: SIGNIFY HOLDING B.V., Eindhoven (NL)

(72) Inventors: Steven Walter Pyshos, Peachtree City, GA (US); Raymond Janik, Fayetteville, GA (US); Kevin Roy Harpenau, Atlanta, GA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/131,940

(22) Filed: Apr. 7, 2023

(65) Prior Publication Data

US 2023/0358389 A1     Nov. 9, 2023

Related U.S. Application Data

(63) Continuation of application No. 17/877,688, filed on Jul. 29, 2022, now Pat. No. 11,662,078, which is a
(Continued)

(51) Int. Cl.
  *H05B 45/20*  (2020.01)
  *F21K 9/62*  (2016.01)
(Continued)

(52) U.S. Cl.
  CPC ............... *F21V 5/04* (2013.01); *F21K 9/62* (2016.08); *F21S 8/026* (2013.01); *F21V 3/02* (2013.01);
(Continued)

(58) Field of Classification Search
  CPC ........ H05B 45/00; H05B 45/10; H05B 45/20; H05B 47/00; H05B 47/10; F21S 8/026;
(Continued)

(56) References Cited

U.S. PATENT DOCUMENTS

| 2,828,393 A | 3/1958 | Wingard |
| 3,502,825 A | 3/1970 | Bailey et al. |

(Continued)

FOREIGN PATENT DOCUMENTS

| CN | 201844227 U | 5/2011 |
| CN | 104312919 A | 1/2015 |

(Continued)

OTHER PUBLICATIONS

Test Report of California Appliance Efficiency Compliance for Permanently Installed High Efficacy LEDs under Title 24, issued Nov. 18, 2015.
(Continued)

*Primary Examiner* — Jimmy T Vu (57) ABSTRACT

A system can configure a luminaire for providing illumination of a selected color temperature, a selected lumen output, or a selected photometric distribution. The luminaire can comprise at least two light sources that have different illumination characteristics, for example different color temperatures, different lumen outputs, or different photometric distributions. The system can configure the luminaire to operate a first of the two light sources, a second of the two light sources, or both of the light sources based on an input. When the luminaire is configured to operate both of the light sources, the luminaire can produce illumination having a color temperature, a lumen output, or a photometric distribution that is different than either of the two light sources.

15 Claims, 10 Drawing Sheets

Related U.S. Application Data continuation of application No. 17/314,092, filed on May 7, 2021, now Pat. No. 11,408,588, which is a continuation of application No. 16/821,381, filed on Mar. 17, 2020, now Pat. No. 11,002,424, which is a continuation of application No. 16/412,215, filed on May 14, 2019, now Pat. No. 10,602,584, which is a continuation of application No. 15/811,062, filed on Nov. 13, 2017, now Pat. No. 10,299,335, which is a continuation of application No. 15/435,141, filed on Feb. 16, 2017, now Pat. No. 9,820,350.

(60) Provisional application No. 62/297,424, filed on Feb. 19, 2016.

(51) Int. Cl.

| | | |
|---|---|---|
| *F21S 8/02* | (2006.01) | |
| *F21V 3/02* | (2006.01) | |
| *F21V 5/04* | (2006.01) | |
| *F21V 7/00* | (2006.01) | |
| *F21V 17/12* | (2006.01) | |
| *F21V 21/088* | (2006.01) | |
| *F21V 23/00* | (2015.01) | |
| *F21V 23/04* | (2006.01) | |
| *H05B 45/10* | (2020.01) | |
| *F21V 21/04* | (2006.01) | |
| *F21Y 113/13* | (2016.01) | |
| *F21Y 115/10* | (2016.01) | |

(52) U.S. Cl.
CPC ............... *F21V 7/00* (2013.01); *F21V 17/12* (2013.01); *F21V 21/088* (2013.01); *F21V 23/001* (2013.01); *F21V 23/04* (2013.01); *H05B 45/10* (2020.01); *H05B 45/20* (2020.01); *F21V 21/049* (2013.01); *F21Y 2113/13* (2016.08); *F21Y 2115/10* (2016.08)

(58) Field of Classification Search
CPC ..... F21V 3/02; F21V 5/04; F21V 7/00; F21V 17/12; F21V 21/088; F21V 23/001; F21V 23/04; F21V 21/049; F21Y 2113/13; F21Y 2115/10; F21K 9/62
See application file for complete search history.

(56) References Cited

U.S. PATENT DOCUMENTS

| | | |
|---|---|---|
| 6,127,783 A | 10/2000 | Pashley et al. |
| 6,149,283 A | 11/2000 | Conway et al. |
| 6,201,351 B1 | 3/2001 | Rudolph et al. |
| 7,014,336 B1 | 3/2006 | Ducharme et al. |
| 7,152,995 B2 | 12/2006 | Chapman |
| 7,178,941 B2 | 2/2007 | Roberge et al. |
| 7,192,160 B2 | 3/2007 | Reiff, Jr. et al. |
| 7,255,457 B2 | 8/2007 | Ducharme et al. |
| 7,416,312 B1 | 8/2008 | McDermott |
| 7,926,300 B2 | 4/2011 | Roberts et al. |
| 8,070,328 B1 | 12/2011 | Knoble et al. |
| 8,172,415 B2 | 5/2012 | Wegh et al. |
| 8,177,390 B2 | 5/2012 | Miskin |
| 8,317,362 B2 | 11/2012 | Ku et al. |
| 8,339,070 B2 | 12/2012 | Lai |
| 8,390,207 B2 | 3/2013 | Dowling et al. |
| 8,598,793 B2 | 12/2013 | Yan et al. |
| 8,641,243 B1 | 2/2014 | Rashidi |
| 8,729,812 B2 | 5/2014 | Kuwu |
| 8,846,423 B2 | 9/2014 | Camras et al. |
| 8,872,438 B2 | 10/2014 | Zhou et al. |
| 8,890,436 B2 | 11/2014 | Chou |
| 8,933,644 B2 | 1/2015 | David et al. |
| 8,941,312 B2 | 1/2015 | McRae |
| 8,947,013 B2 | 2/2015 | Sutardja et al. |
| 9,072,148 B2 | 6/2015 | Tanaka et al. |
| 9,119,252 B2 | 8/2015 | Wu |
| 9,144,128 B2 | 9/2015 | Shin et al. |
| 9,144,129 B2 | 9/2015 | Munday et al. |
| 9,247,597 B2 | 1/2016 | Miskin et al. |
| 9,345,112 B2 | 5/2016 | Chen |
| 9,360,179 B2 | 6/2016 | Howard et al. |
| 9,445,473 B1 | 9/2016 | Chang et al. |
| 9,719,642 B1 | 8/2017 | Macias |
| 9,750,098 B2 | 8/2017 | Miskin et al. |
| 9,788,373 B1 | 10/2017 | Chowdhury |
| 9,801,245 B2 | 10/2017 | McMillan |
| 9,801,250 B1 | 10/2017 | Halliwell |
| 9,820,350 B2 | 11/2017 | Pyshos et al. |
| 9,892,693 B1 | 2/2018 | Kumar et al. |
| 9,900,945 B1 | 2/2018 | Janik et al. |
| 9,970,634 B1 | 5/2018 | Wronski et al. |
| 10,091,855 B2 | 10/2018 | Van Winkle |
| 10,116,127 B1 | 10/2018 | Lopez-Martinez et al. |
| 10,136,503 B2 | 11/2018 | Chen |
| 10,163,405 B2 | 12/2018 | Kumar et al. |
| 10,234,091 B1 | 3/2019 | Chaimberg et al. |
| 10,278,250 B2 | 4/2019 | Mcbryde et al. |
| 10,290,265 B2 | 5/2019 | Kumar et al. |
| 10,299,335 B2 | 5/2019 | Pyshos et al. |
| 10,299,336 B2 | 5/2019 | Bowen et al. |
| 10,349,479 B2 | 7/2019 | Miskin et al. |
| 10,492,260 B2 | 11/2019 | Miskin et al. |
| 10,502,404 B1 | 12/2019 | Bowen et al. |
| 10,527,271 B2 | 1/2020 | Koo et al. |
| 10,602,584 B2 | 3/2020 | Pyshos et al. |
| 10,616,969 B2 | 4/2020 | Bowen et al. |
| 10,634,321 B2 | 4/2020 | Tickner et al. |
| 10,683,969 B2 | 6/2020 | Jeswani et al. |
| 10,980,092 B2 | 4/2021 | Miskin et al. |
| 11,632,836 B2 | 4/2023 | Lee |
| 11,638,336 B2 | 4/2023 | Miskin et al. |
| 11,721,675 B2 | 8/2023 | Yamakawa et al. |
| 11,729,884 B2 | 8/2023 | Miskin et al. |
| 12,028,947 B2 | 7/2024 | Miskin et al. |
| 12,213,224 B2 | 1/2025 | Miskin et al. |
| 2005/0077837 A1 | 4/2005 | Kim et al. |
| 2005/0285547 A1 | 12/2005 | Piepgras et al. |
| 2006/0007682 A1 | 1/2006 | Reiff Jr. et al. |
| 2006/0109649 A1 | 5/2006 | Ducharme et al. |
| 2006/0220586 A1 | 10/2006 | Latham |
| 2008/0060917 A1 | 3/2008 | Chia-Li et al. |
| 2009/0258524 A1 | 10/2009 | McEnery |
| 2010/0000758 A1 | 1/2010 | Bravo et al. |
| 2010/0110699 A1 | 5/2010 | Chou |
| 2010/0237798 A1 | 9/2010 | Wolf et al. |
| 2010/0261260 A1 | 10/2010 | Morgan |
| 2011/0031890 A1 | 2/2011 | Stack |
| 2011/0089866 A1 | 4/2011 | Trotter et al. |
| 2011/0115390 A1 | 5/2011 | Ku et al. |
| 2012/0038291 A1 | 2/2012 | Hasnain |
| 2012/0242247 A1 | 9/2012 | Hartmann et al. |
| 2013/0038222 A1 | 2/2013 | Yeh et al. |
| 2013/0063045 A1 | 3/2013 | Ishikita et al. |
| 2013/0114241 A1 | 5/2013 | Van de Ven et al. |
| 2013/0175938 A1 | 7/2013 | Lu et al. |
| 2013/0200814 A1 | 8/2013 | Chen et al. |
| 2013/0234622 A1 | 9/2013 | Tanaka et al. |
| 2013/0328493 A1 | 12/2013 | Munday |
| 2013/0328503 A1 | 12/2013 | Toda |
| 2014/0009954 A1 | 1/2014 | Mochizuki |
| 2014/0062313 A1 | 3/2014 | Ootsubo et al. |
| 2014/0159600 A1 | 6/2014 | Sutardja et al. |
| 2014/0210357 A1 | 7/2014 | Yan et al. |
| 2014/0210376 A1 | 7/2014 | Hicks, IV |
| 2014/0301073 A1 | 10/2014 | Miskin |
| 2014/0301074 A1 | 10/2014 | Miskin |
| 2014/0312777 A1 | 10/2014 | Shearer et al. |
| 2015/0054410 A1 | 2/2015 | Sanders et al. |
| 2015/0061497 A1 | 3/2015 | Martins et al. |
| 2015/0085499 A1 | 3/2015 | Mandy et al. |
| 2015/0085500 A1 | 3/2015 | Cooper et al. |
| 2015/0108904 A1 | 4/2015 | Chen |

(56) References Cited

U.S. PATENT DOCUMENTS

| | | | |
|---|---|---|---|
| 2015/0271891 A1 | 9/2015 | Wu et al. | |
| 2015/0382420 A1 | 12/2015 | Sakai et al. | |
| 2016/0120001 A1 | 4/2016 | Clark et al. | |
| 2016/0186968 A1 | 6/2016 | Edwards | |
| 2016/0320044 A1 | 11/2016 | Romano et al. | |
| 2016/0330805 A1 | 11/2016 | Briggs | |
| 2017/0086265 A1 | 3/2017 | Akiyama et al. | |
| 2017/0105265 A1 | 4/2017 | Sadwick | |
| 2017/0363261 A1 | 12/2017 | White | |
| 2018/0180233 A1 | 6/2018 | Mellor et al. | |
| 2018/0323592 A1 | 11/2018 | Wronski et al. | |
| 2019/0044313 A1 | 2/2019 | Momin et al. | |
| 2019/0178453 A1 | 6/2019 | Zeng et al. | |
| 2019/0364645 A1* | 11/2019 | Chen | H05B 47/13 |

FOREIGN PATENT DOCUMENTS

| | | |
|---|---|---|
| CN | 104780945 A | 7/2015 |
| CN | 109225095 A | 1/2019 |
| JP | 2012079965 A | 4/2012 |

OTHER PUBLICATIONS

Energy Star, Certificate of Compliance; Certificate No. 1129756, issued Nov. 25, 2015.

Test Report of IES LM-79-08; Approved Method: Electrical and Photometric Measurements of Solid-State Lighting Products, issued Nov. 18, 2015.

Kay, Gregory, "Architectural SSL—Tunable white light and its benefits become more accessible," Sep. 14, 2003. LEDs Magazine, https://www.ledsmagazine.com/architectural-lighting/article/14298849/architectural-ssl-tunable-white-light-and-its-benefits-become-more-accessible.

Montes de Oca, Samantha, "SuperBrightLEDs.com—LED Lighting for Everything," Mar. 2, 2016, CCT: Understanding the Basics. https://www.superbrightleds.com/blog/what-is-cct-understanding-the-basics.html.

IPR2024-00101 U.S. Pat. No. 10,299,336 B2: Final Written Decision—*Luminex International Company, Ltd.* V. *Signify Holdings B.V.*, Aug. 13, 2025 (162 Pages).

* cited by examiner

CONFIGURABLE LIGHTING SYSTEM

CROSS REFERENCE TO RELATED APPLICATIONS

The present application is a continuation application of and claims priority to U.S. patent application Ser. No. 17/877,688, filed on Jul. 29, 2022, and titled "Configurable Lighting System," which is a continuation application of and claims priority to U.S. patent application Ser. No. 17/314, 092, filed on May 7, 2021, and titled "Configurable Lighting System," and which issued as U.S. Pat. No. 11,408,588 on Aug. 9, 2022, which is a continuation application of and claims priority to U.S. patent application Ser. No. 16/821, 381, filed Mar. 17, 2020, and titled "Configurable Lighting System," and which issued as U.S. Pat. No. 11,002,424 on May 11, 2021, which is a continuation application of and claims priority to U.S. patent application Ser. No. 16/412, 215, filed May 14, 2019, and titled "Configurable Lighting System," and which issued as U.S. Pat. No. 10,602,584 on Mar. 24, 2020, which is a continuation application of and claims priority to U.S. patent application Ser. No. 15/811, 062, filed Nov. 13, 2017, and titled "Configurable Lighting System," and which issued as U.S. Pat. No. 10,299,335 on May 21, 2019, which is a continuation application of and claims priority to U.S. patent application Ser. No. 15/435, 141, filed Feb. 16, 2017, and titled "Configurable Lighting System," and which issued as U.S. Pat. No. 9,820,350 on Nov. 14, 2017, which claims priority to U.S. Provisional Patent Application No. 62/297,424 filed Feb. 19, 2016, and titled "Configurable Lighting System". The entire contents of the foregoing applications are hereby incorporated herein by reference.

TECHNICAL FIELD

Embodiments of the technology relate generally to lighting systems and more specifically to lighting systems that can be readily configured to produce illumination of different color temperatures.

BACKGROUND

For illumination applications, light emitting diodes (LEDs) offer substantial potential benefit associated with their energy efficiency, light quality, and compact size. However, to realize the full potential benefits offered by light emitting diodes, new technologies are needed.

With luminaires that incorporate incandescent or fluorescent technology, some flexibility can be obtained by swapping lamps to meet user preferences. In such luminaires, lamp selection can provide flexibility in terms of correlated color temperature (CCT or color temperature) and light output (lumen output). For example, a compact fluorescent downlight might accept 6-, 32-, and 42-watt lamps in 2700, 3000, and 3500 K CCT. Additionally, changing lamp position and focal point in a reflector of an incandescent or fluorescent fixture can change the fixture spacing criteria (SC) of a luminaire.

In contrast, conventional light-emitting-diode-based luminaires typically offer reduced flexibility when the luminaire's light-emitting-diode-based light source is permanently attached to the luminaire. Stocking conventional light-emitting-diode-based luminaires at distribution to accommodate multiple configurations that users may desire can entail maintaining a relatively large or cumbersome inventory.

Need is apparent for a technology to provide a light emitting diode system that can adapt to various applications, for example by delivering multiple color temperatures, multiple lumens, and/or multiple photometric distributions. Need further exists for a capability to enable a single luminaire to be stocked at distribution and then quickly configured according to application parameters and deployment dictates. Need further exists for luminaires that are both energy efficient and flexible. A capability addressing one or more such needs, or some other related deficiency in the art, would support improved illumination systems and more widespread utilization of light emitting diodes in lighting applications.

SUMMARY

In some aspects of the disclosure, a system can configure a luminaire for providing illumination of a selected color temperature, a selected lumen output, or a selected photometric distribution based on an input. The input may be field selectable or may be selectable at a distribution center or at a late stage of luminaire manufacture, for example.

In some aspects of the disclosure, the luminaire can comprise at least two light sources having different color temperatures. In a first configuration, the luminaire can produce illumination of a first color temperature using a first one of the light sources. In a second configuration, the luminaire can produce illumination of a second color temperature using a second one of the light sources. In a third configuration, the luminaire can produce illumination of a third color temperature using both of the first and second the light sources. The third color temperature may be between the first and second color temperatures. The value of the third color temperature within a range between the first and second color temperatures can be controlled by manipulating the relative amounts of light output by the first and second light sources. That is, adjusting the lumen outputs of the first and second light sources can define the color temperature of the illumination produced by the luminaire in the third configuration.

In some aspects of the disclosure, the luminaire can comprise at least two light sources having different lumen outputs. In a first configuration, the luminaire can produce illumination of a first lumen output using a first one of the light sources. In a second configuration, the luminaire can produce illumination of a second lumen output using a second one of the light sources. In a third configuration, the luminaire can produce illumination of a third lumen output using both of the first and second light sources.

In some aspects of the disclosure, the luminaire can comprise at least two light sources having different photometric distributions. In a first configuration, the luminaire can produce illumination of a first photometric distribution using a first one of the light sources. In a second configuration, the luminaire can produce illumination of a second photometric distribution using a second one of the light sources. In a third configuration, the luminaire can produce illumination of a third photometric distribution using both of the first and second light sources.

In some aspects of the disclosure, a circuit and an associated input to the circuit can configure a luminaire for providing illumination having a selected property, for example a selected color temperature, a selected lumen output, or a selected photometric distribution. The input can be settable to a first number of states. The circuit can map the first number of states into a second number of states that is less than the first number of states. For example, the input can have four states and the circuit can map these four states into three states. The three states can correspond to three different values of the illumination property, for example three different color temperatures, three different lumen outputs, or three different photometric distributions.

The foregoing discussion of controlling illumination is for illustrative purposes only. Various aspects of the present disclosure may be more clearly understood and appreciated from a review of the following text and by reference to the associated drawings and the claims that follow. Other aspects, systems, methods, features, advantages, and objects of the present disclosure will become apparent to one with skill in the art upon examination of the following drawings and text. It is intended that all such aspects, systems, methods, features, advantages, and objects are to be included within this description and covered by this application and by the appended claims of the application.

Many aspects of the disclosure can be better understood with reference to the above drawings. The drawings illustrate only example embodiments and are therefore not to be considered limiting of the embodiments described, as other equally effective embodiments are within the scope and spirit of this disclosure. The elements and features shown in the drawings are not necessarily drawn to scale, emphasis instead being placed upon clearly illustrating principles of the embodiments. Additionally, certain dimensions or positionings may be exaggerated to help visually convey certain principles. In the drawings, similar reference numerals among different figures designate like or corresponding, but not necessarily identical, elements.

DESCRIPTION OF EXAMPLE EMBODIMENTS

In some example embodiments of the disclosure, a luminaire can comprise multiple groups of light emitting diodes of different color temperatures and a constant current power supply for powering the light emitting diodes. The power supply can utilize a switching scheme that can turn each group of light emitting diodes on and off to change the color temperature of the luminaire. In some example embodiments, the power supply can further vary the relative intensities of the light emitting diodes to manipulate the color temperature of the luminaire within a range.

For example, the luminaire can comprise a 3,000 K group of light emitting diodes and a 4,000 K group of light emitting diodes. When only the 3,000 K group is on, the luminaire can deliver 3,000 K illumination. When only the 4,000 K group is on, the luminaire can deliver 4,000 K illumination. When the 3,000 K group and the 4,000 K group are both on, the luminaire can deliver 3,500 K illumination. If the 4,000 K group of light emitting diodes is concurrently operated at a low lumen output and the 3,000 K group is operated at a high lumen output, the luminaire may deliver illumination of another selected color temperature, for example 3,100 K.

In some example embodiments, a controller can adjust lumen output automatically to maintain constant delivered lumens across multiple color temperatures or to suit application requirements. The controller implements the adjustment utilizing programmable driver current and/or via turning on and off various groups of light emitting diodes. Configurable color temperature or lumen output can function in combination with integral dimming, for example to facilitate interface with building automation, sensors, and dimmers.

In some example embodiments, luminaires can achieve an additional level of flexible configuration at a distribution center using interchangeable optics. For example, primary optics can provide medium distribution (e.g. spacing criteria equals 1.0), while a diffuser or concentrator lens can be used to achieve wide distribution (e.g. spacing criteria equals 1.4), and narrow distribution (e.g. spacing criteria equals 0.4).

In some example embodiments, a luminaire's configuration of delivered lumens and color temperatures can be set at the factory, at distribution, or in the field. To meet current and emerging code compliance, performance markings on a luminaire can indicate and correspond to the desired setting. Economical, field-installed nameplates can identify the various electrical and optical performance ratings and, when installed, permanently program the delivered lumens and color temperature. Other settings, such as dimming protocols, can likewise be configured. The interface between the nameplate and internal logic can use mechanical, electrical or optical means, for example.

Accordingly, in some embodiments of the disclosure, the technology provides product markings and supports regulatory compliance. For example, nameplates can indicate energy codes and rebate opportunities, for compliance with product labeling and to facilitate compliance confirmation by local authorities who may have jurisdiction.

Figure 1A:
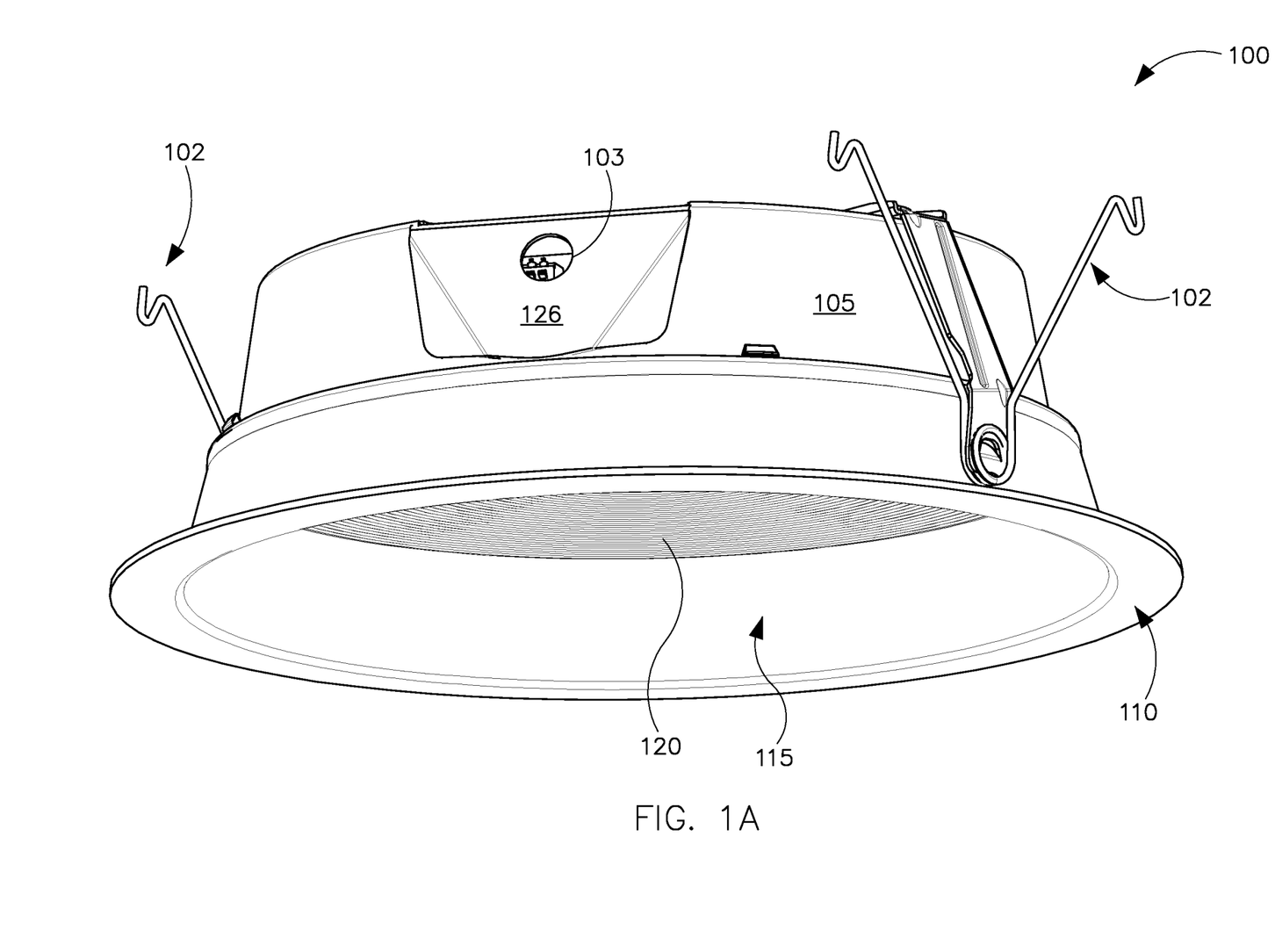
FIGS. 1A, 1B, 1C, 1D, 1E, 1F, 1G, 1H, 1I, 1J, and 1K (collectively FIG. 1) illustrate views of a luminaire in accordance with some example embodiments of the disclosure.
Figure 1B:
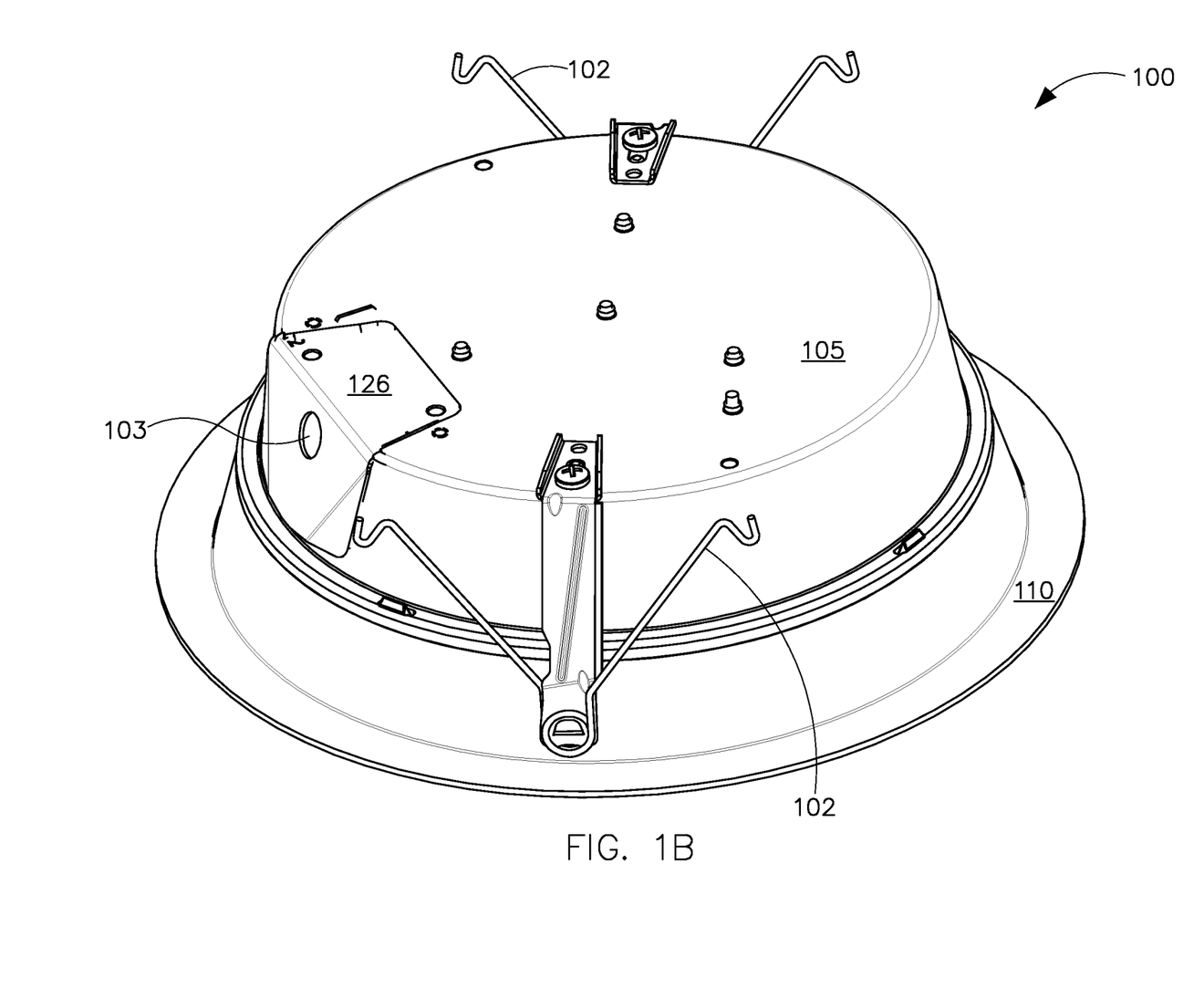
Figure 1C:
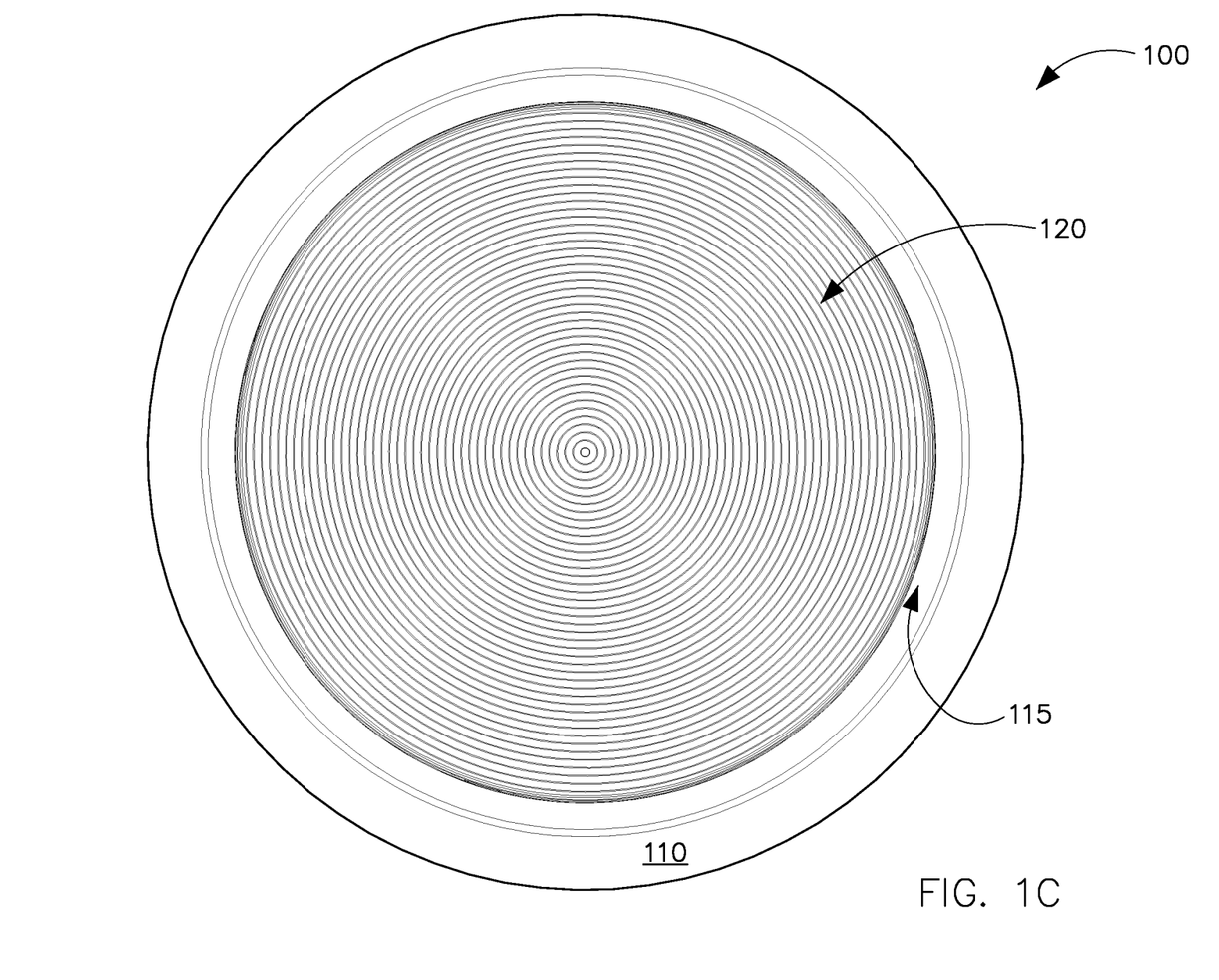
Figure 1D:
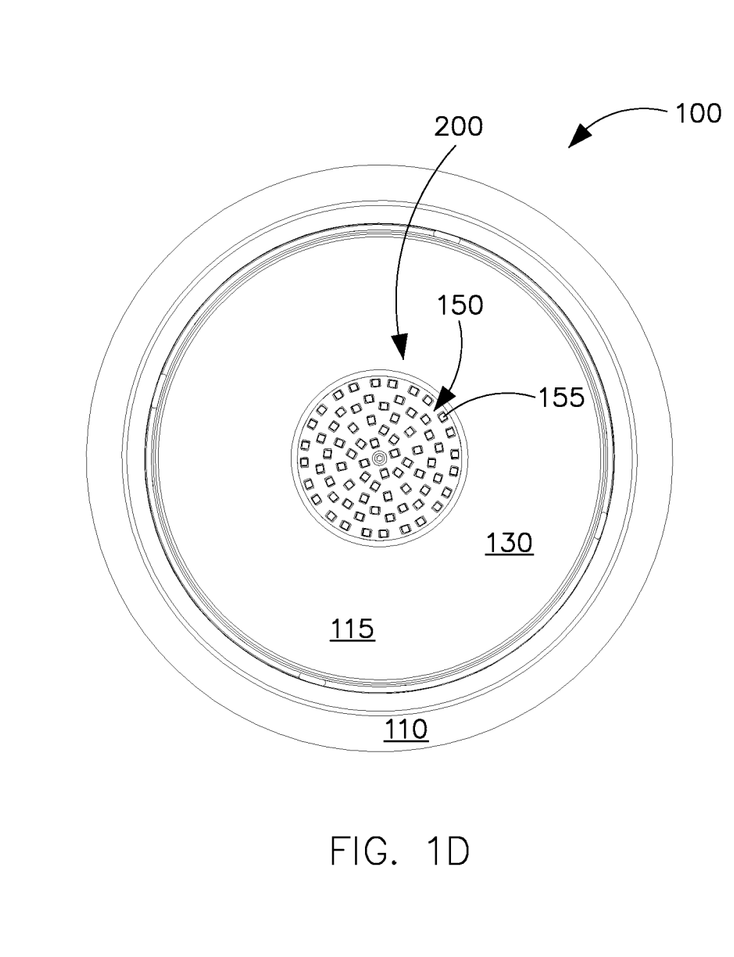
Figure 1E:
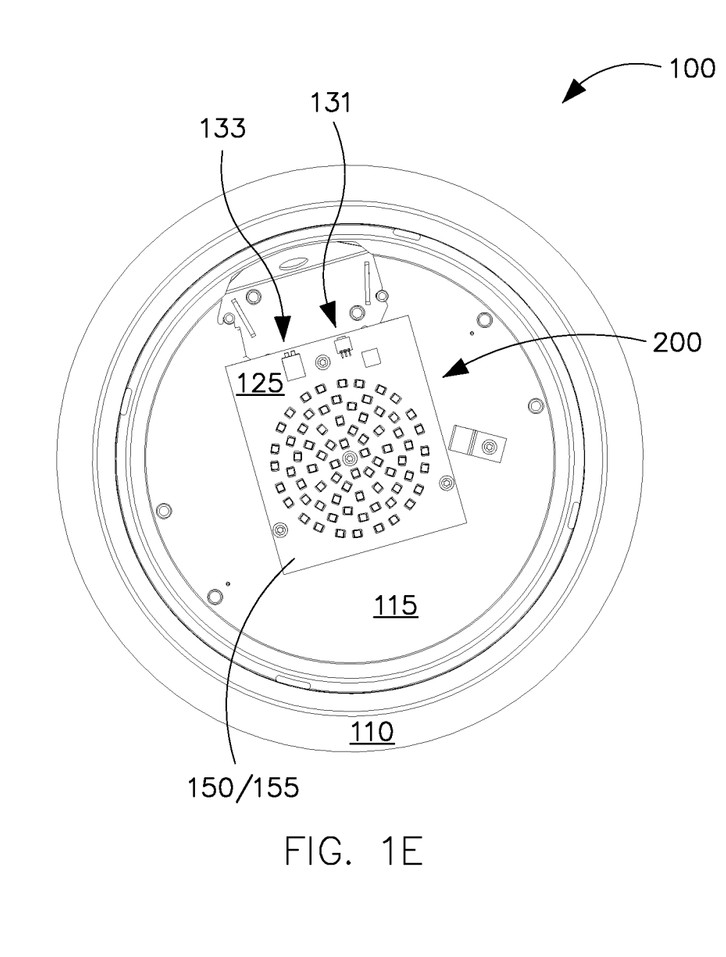
Figure 1F:
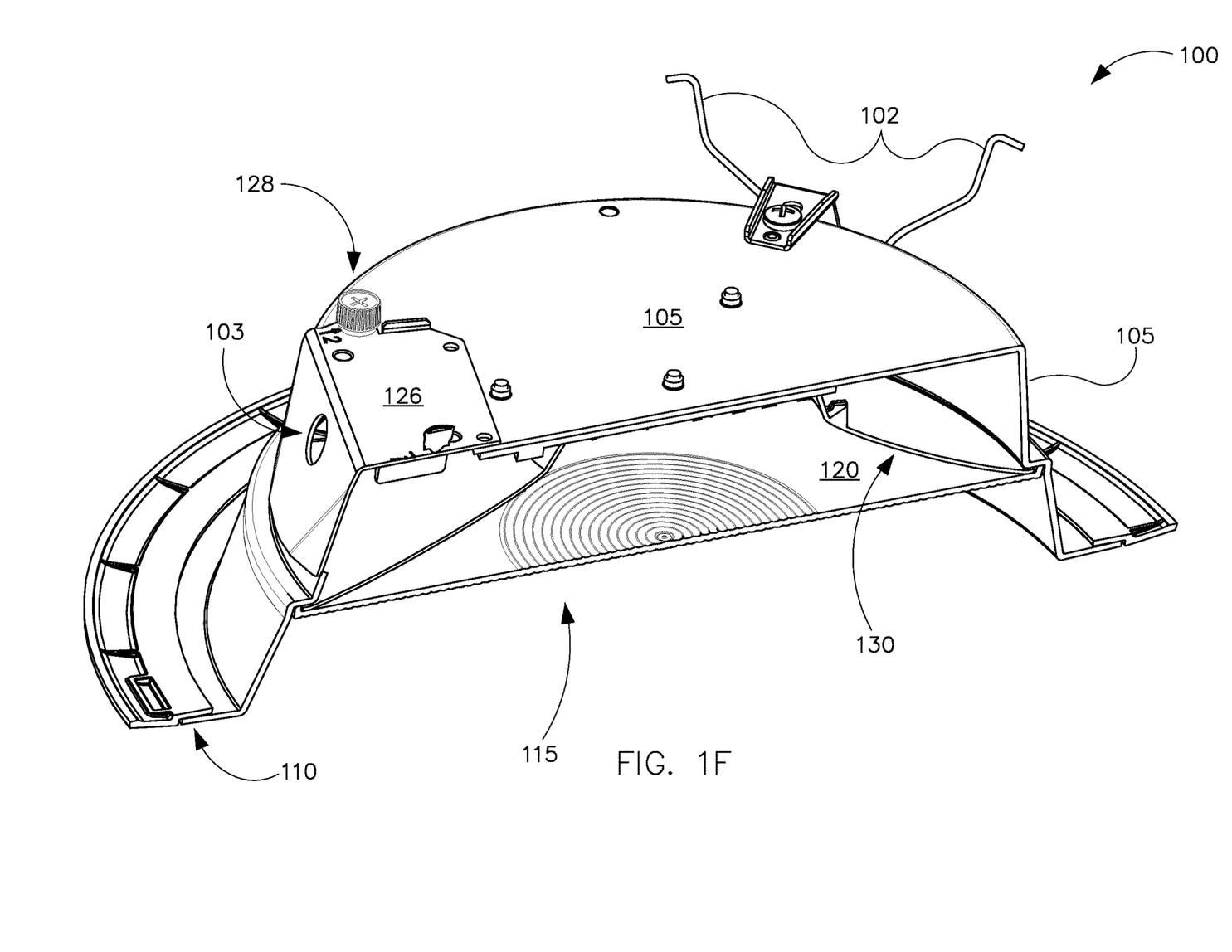
Figure 4:
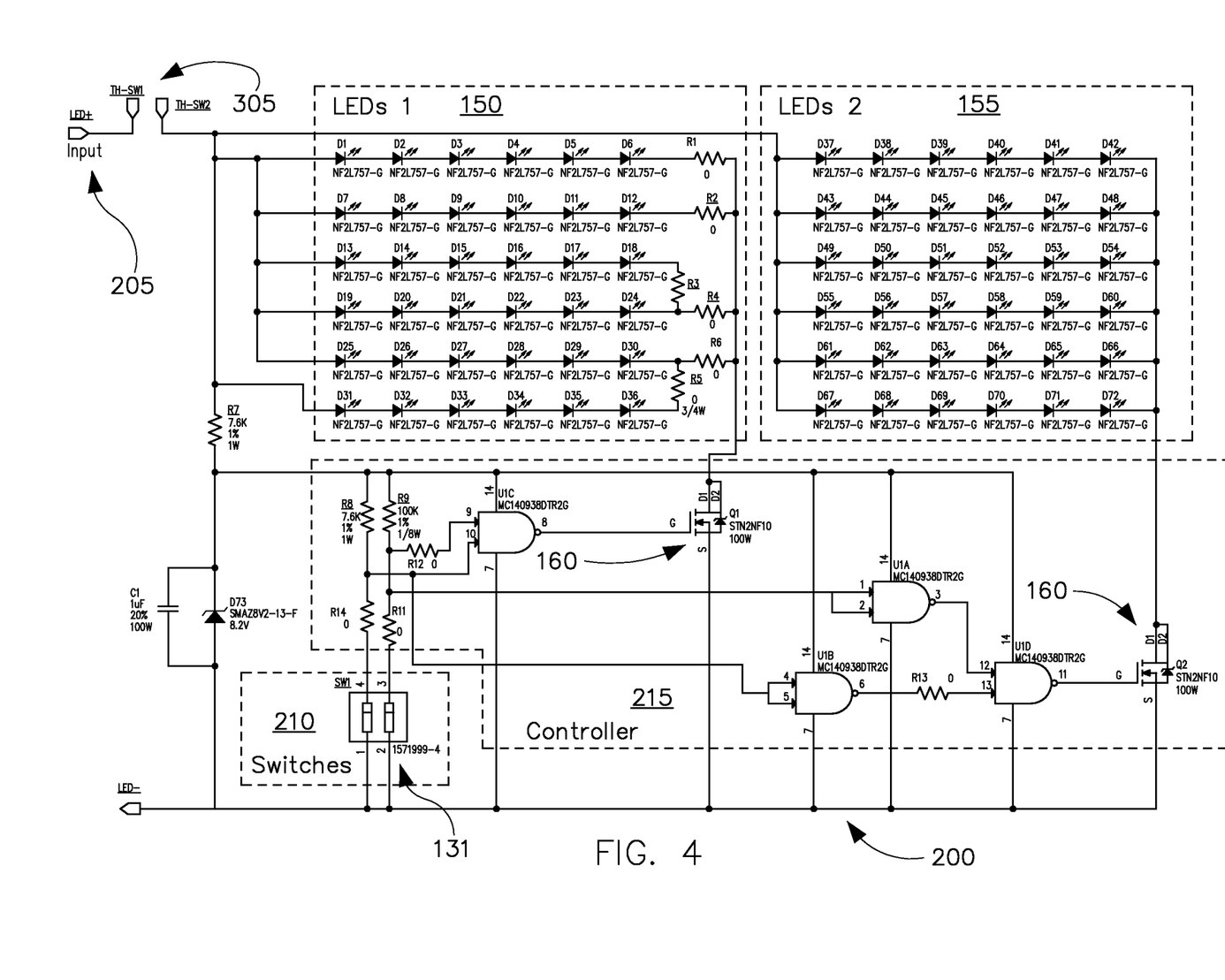
FIG. 4 illustrates a schematic of a circuit that a luminaire can comprise in accordance with some example embodiments of the disclosure.

Some representative embodiments will be further described hereinafter with example reference to the accompanying drawings that describe representative embodiments of the present technology. In the drawings, FIG. 1 illustrates views of a representative luminaire 100; FIG. 2 illustrates a functional block diagram of a representative circuit 200 that the luminaire 100 can comprise; FIG. 3 illustrates a representative state table for the circuit 200; and FIG. 4 illustrates a representative schematic for the circuit 200. The technology may, however, be embodied in many different forms and should not be construed as limited to the embodiments set forth herein; rather, these embodiments are provided so that this disclosure will be thorough and complete, and will fully convey the scope of the technology to those appropriately skilled in the art.

Referring now to FIG. 1, multiple views of the luminaire 100 are shown. FIG. 1A illustrates a side perspective view of the luminaire 100. FIG. 1B illustrates a top perspective view of the luminaire 100. FIG. 1C illustrates a view of the light-emitting bottom of the luminaire 100, showing a lens 120 in a light-emitting aperture 115 of the luminaire 100. FIG. 1D illustrates a view of the light-emitting bottom of the luminaire 100 with the lens 120 removed from the light-emitting aperture 115 of the luminaire. FIG. 1E illustrates a view of the light-emitting bottom of the luminaire 100 with the lens 120 and an associated reflector 130 removed from the light-emitting aperture 115 of the luminaire. FIG. 1F illustrates a cutaway perspective view of the luminaire 100.

Figure 1G:
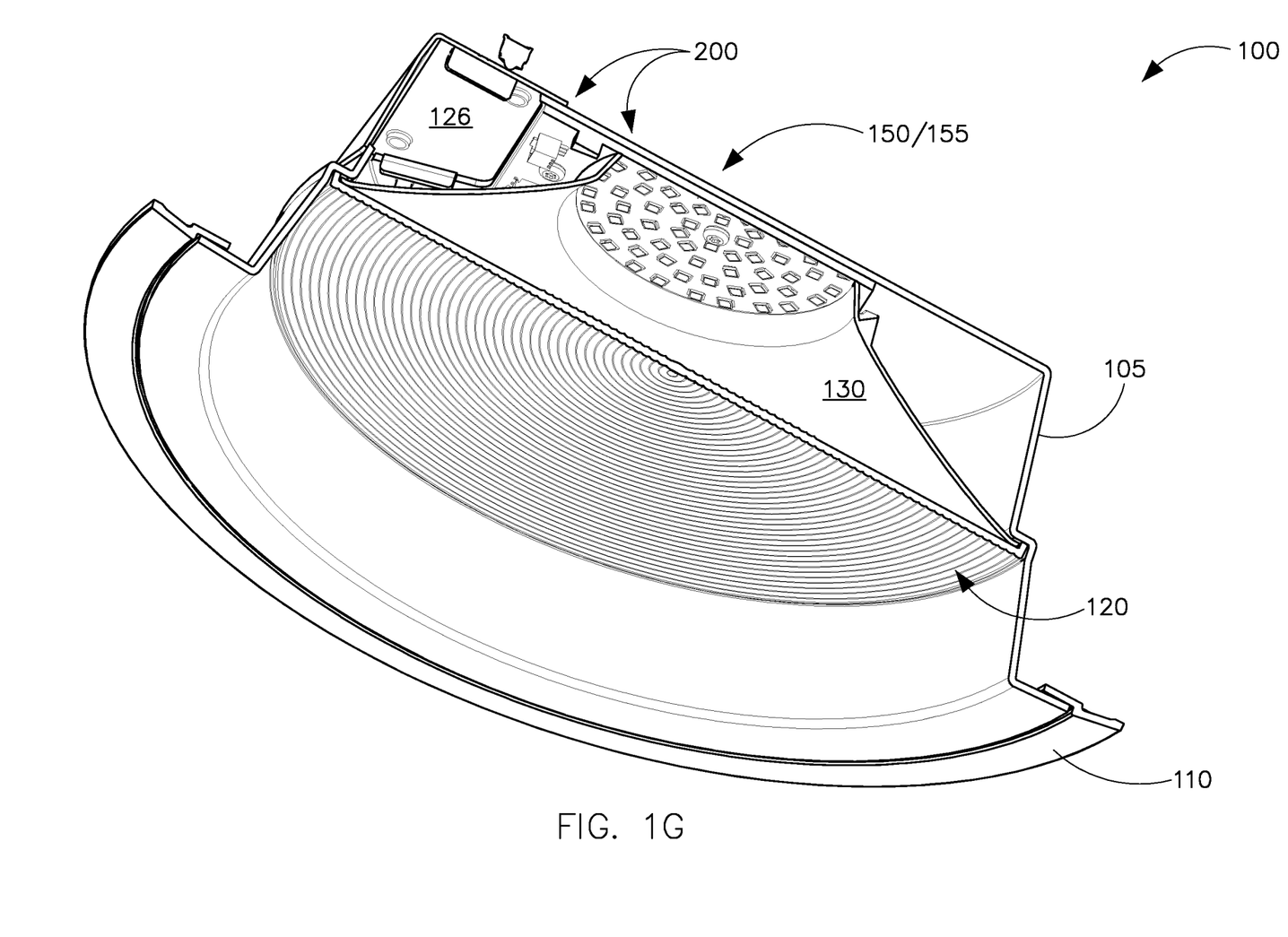
Figure 1H:
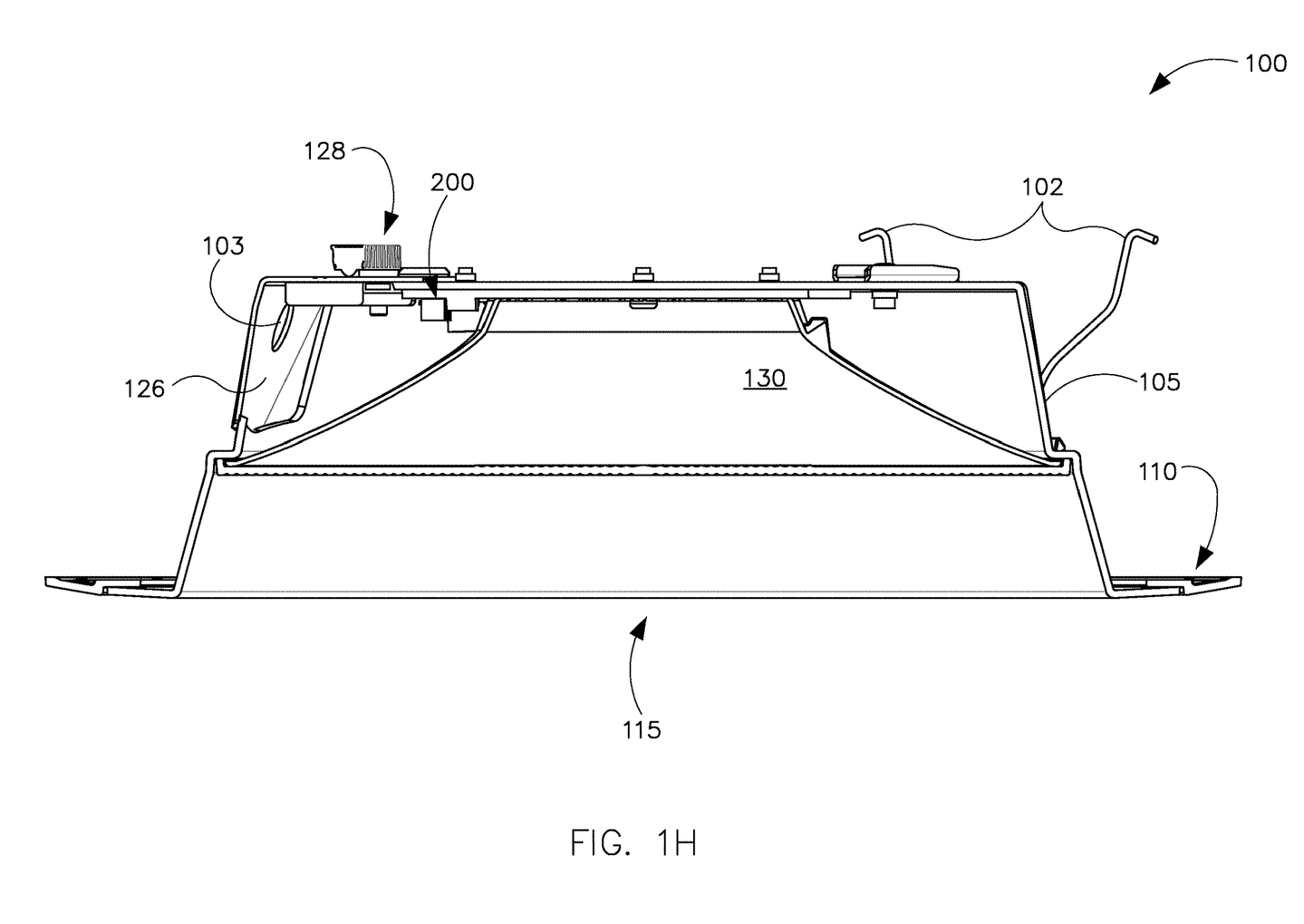
Figure 1I:
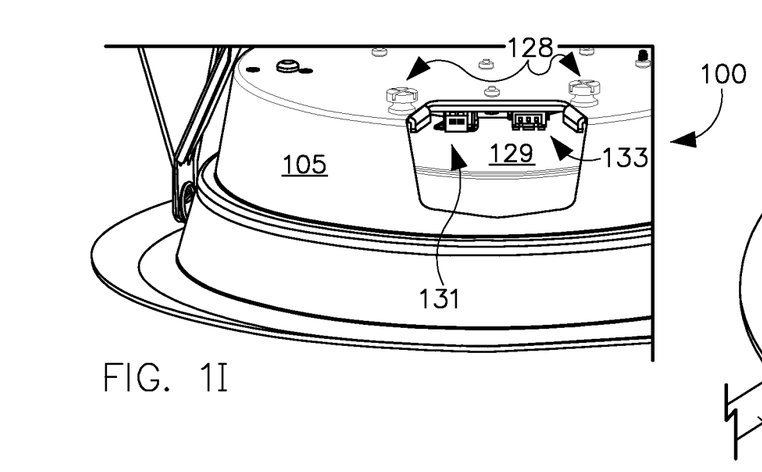
Figure 1J:
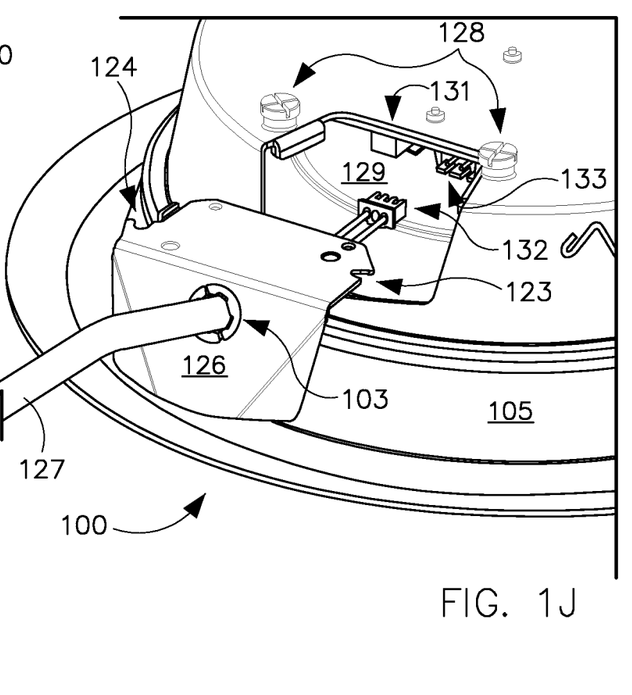
Figure 1K:
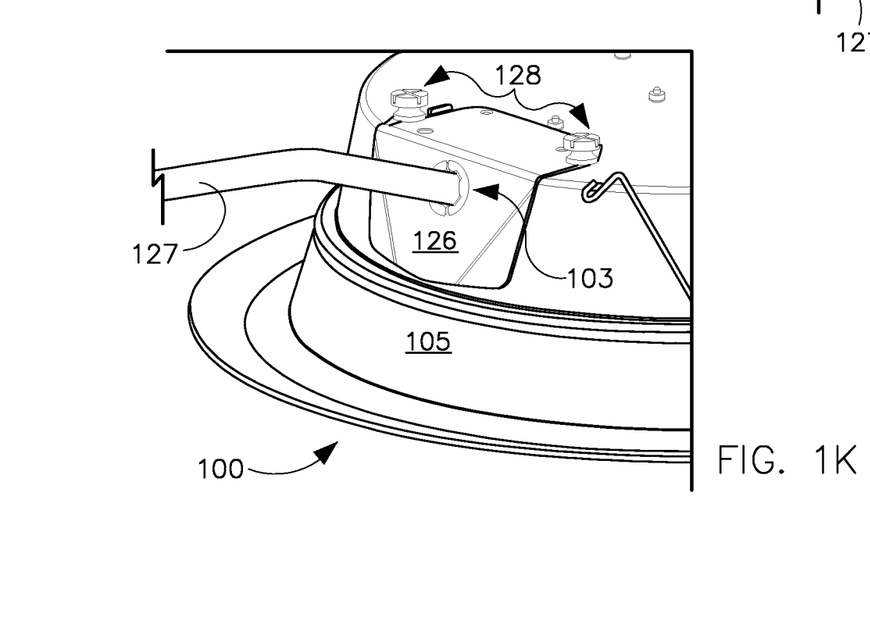
Figures 2, 3:
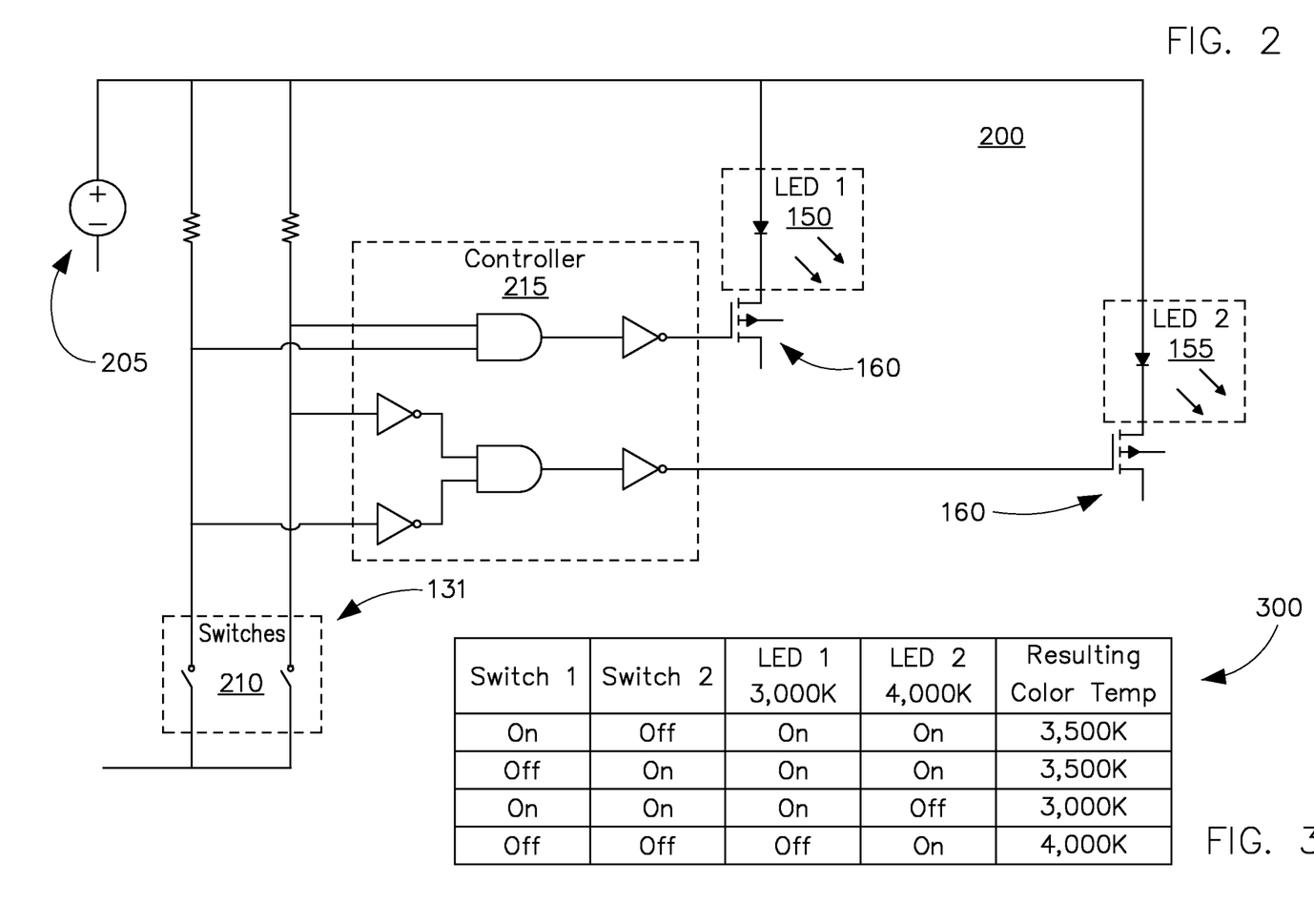
FIG. 2 illustrates a functional block diagram of a circuit that a luminaire can comprise in accordance with some example embodiments of the disclosure.
FIG. 3 illustrates a state table for a circuit that a luminaire can comprise in accordance with some example embodiments of the disclosure.

FIG. 1G illustrates another cutaway perspective view of the luminaire 100. FIG. 1H illustrates another cutaway view of the luminaire 100. FIGS. 1I, 1J, and 1K provide detailed views of a portion of the luminaire 100 comprising a cover 126 and an associated access aperture 129 for providing internal access to the luminaire 100. In FIG. 1I, the cover 126 is fully removed. In FIG. 1J, the cover 126 is positioned adjacent the access aperture 129, for example in connection with attachment or removal of the cover 126. In FIG. 1K, the cover 126 is attached to the luminaire 100.

As best seen in the views of FIGS. 1A and 1B, the illustrated example luminaire 100 is suited for inserting in an aperture in a ceiling to provide overhead lighting. In this example embodiment, the luminaire 100 can be characterized as an overhead light or a recessed ceiling light. Various other indoor and outdoor luminaires that may be mounted in a wide range of orientations can be substituted for the luminaire 100 illustrated in FIG. 1.

The illustrated example luminaire 100 of FIG. 1 comprises a housing 105 that is circular with a protruding rim 110 that extends circumferentially about the housing 105. When the luminaire 100 is installed in a ceiling aperture, the rim 100 circumscribes and covers the edge of the ceiling aperture for aesthetics, for support, and for blocking of debris from above the ceiling. Hanger clips 102 hold the luminaire 100 in place in installation.

As best illustrated in FIGS. 1I, 1J, and 1K, the example luminaire 100 comprises an access aperture 129 and an associated cover 126. The access aperture 129 provides access to the interior of the luminaire housing 105, for example in the field and/or during luminaire installation. An installer can remove the cover 126 and manually set a dual inline pin (DIP) switch 131 to configure the luminaire 100 for long-term operation providing illumination with a selected color temperature, a selected lumen output, and/or a selected photometric distribution. As illustrated, the dual inline pin switch 131 is mounted on a circuit board adjacent the access aperture 129, thereby facilitating convenient and efficient access in the field or at a distribution center, for example.

An electrical cable 127 extends through a wiring aperture 103 in the cover 126. The electrical cable 127 terminates in a plug 132 that mates with a receptacle 133 that is mounted inside the housing 105 adjacent the access aperture 129 for convenient field access.

As illustrated, the example cover 126 comprises two notches 123, 124 that each receives a respective screw 128 for holding the cover 126 in place. The notch 123 is disposed on the right side of the cover 126 and is sized to receive one of the screws 128. Meanwhile, the notch 124 is disposed on a left side of the cover 126 and is sized to receive the other screw 128.

The left notch 124 and the right notch 123 are oriented so that the cover 126 is rotatable about the right screw 128 when the right screw 128 is loosely disposed in the right notch 123. In other words, cover rotation can occur when the right screw 128 is in the right notch 123 with threads engaged but prior to tightening. In this position, the cover 126 can rotate clockwise about the right screw 128. Thus, the right screw 128 provides an axis of rotation for the cover 126. This clockwise rotation facilitates convenient manipulation of the cover 126 by a person working the cover 126 to cover the access aperture 129, with the screws 128 engaged but not fully tightened. The clockwise rotation of the cover 126 about the right screw 128 provides the person with a capability to slide the left notch 124 of the cover 126 conveniently under the head of the left screw 128. Once the cover 126 is rotated so the left notch 124 is under the head of the left screw 128, the person (for example an installer) can tighten the two screws 128 to secure the cover 126.

To remove the cover 126, the person loosens the two screws 128 and then rotates the cover 126 counterclockwise about the right screw 128 so that the left notch 124 moves out from under the head of the left screw 128. Once the left notch 124 is free from the left screw 128, the installer can pull the right notch 123 out from under the right screw 128 to fully remove the cover 126.

As best seen in the views of FIGS. 1A, 1C, 1F, and 1G, the lens 120 of the luminaire 100 is positioned adjacent the lower, exit side of the light-emitting aperture 115. As illustrated, the lens 120 can mix and blend light emitted by two groups of light emitting diodes 150, 155, with each group having a different color temperature. In some embodiments, the two groups of light emitting diodes 150, 155 may have color temperatures that differ by at least 500 Kelvin, for example. The group of light emitting diodes 150 can be characterized as one light emitting diode light source, while the group of light emitting diodes 155 can be characterized as another light emitting diode light source. Other embodiments of a light emitting diode light source may have a single light emitting diode or more light emitting diodes than the embodiment illustrated in FIG. 1. A reflector 130 is disposed in and lines the aperture 115 to guide and manage the emitted light between the light emitting diodes 150, 155 and the lens 120. In some embodiments, an upper lens (not illustrated) replaces the reflector 130.

The light emitting diodes 150, 155 are mounted on a substrate 125, for example a circuit board, and form part of a circuit 200. In the illustrated embodiment, the light emitting diodes 150, 155 are interspersed. In other embodiments, the light emitting diodes 150, 155 may be separated from one another or spatially segregated according to color temperature or other appropriate parameter. As discussed in further detail below, the circuit 200 supplies electricity to the light emitting diodes 150, 155 with a level of flexibility that facilitates multiple configurations suited to different applications and installation parameters.

Turning to FIGS. 2, 3, and 4, some example embodiments of the circuit 200 will be discussed in further detail with example reference to the luminaire 100. The circuit 200 can be applied to other indoor and outdoor luminaires.

Referring now to FIG. 2, this figure illustrates an embodiment of the circuit 200 in an example block diagram form. The circuit 200 comprises a DC power supply 205 for supplying electrical energy that the circuit 200 delivers to the light emitting diodes 150, 155. In an example embodiment, the circuit 200 comprises a light emitting diode driver.

The dual inline pin switch 131 comprises individual switches 210 that provide an input for configuring the luminaire 100 to operate at a selected color temperature. In the illustrated embodiment, the circuit 200 comprises two manual switches 210. Other embodiments may have fewer or more switches 210. In various embodiments, the switches 210 can be mounted to the housing 105 of the luminaire 100, for example within the housing 105 (as illustrated in FIG. 1 and discussed above) or on an exterior surface of the housing 105. In some embodiments, the switches 210 are mounted on the substrate 125. In some embodiments, the switches 210 are implemented via firmware or may be solid state.

As an alternative to the illustrated dual inline pin switch 131, the input can comprise multiple DIP switches, one or more single in-line pin packages (SIP or SIPP), one or more rocker switches, one or more reed switches, one or more magnetic switches, one or more rotary switches, one or more rotary dials, one or more selectors or selector switches, one or more slide switches, one or more snap switches, one or more thumbwheels, one or more toggles or toggle switches, one or more keys or keypads, or one or more buttons or pushbuttons, to mention a few representative examples without limitation.

As further discussed below, a controller 215 operates the light emitting diodes 150, 155 according to state of the switches 210. In some example embodiments, the controller 215 comprises logic implemented in digital circuitry, for example discrete digital components or integrated circuitry. In some example embodiments, the controller 215 utilizes microprocessor-implemented logic with instructions stored in firmware or other static or non-transitory memory.

In the illustrated embodiment, the outputs of the controller 215 are connected to two MOSFET transistors 160 to control electrical flow through two light emitting diodes 150, 155. The illustrated MOSFET transistors 160 provide one example and can be replaced with other appropriate current control devices or circuits in various embodiments. The switches 210 thus configure the luminaire 100 to operate with either or both of the light emitting diodes 150, 155. The light emitting diodes 150, 155 illustrated in FIG. 2 may represent two single light emitting diodes or two groups of light emitting diodes, for example.

FIG. 3 illustrates a representative table 300 describing operation of the circuit 100 according to some example embodiments. In the example of FIG. 3, the light emitting diode 150 produces light having a color temperature of 3,000 Kelvin, and the light emitting diode 155 produces light having a color temperature of 4,000 Kelvin. As shown in the example table 300, when both of the switches 210 are in the on state, the controller 215 causes the light emitting diode 155 to be off and the light emitting diode 150 to be on. Accordingly, the luminaire 100 emits illumination having a color temperature of 3,000 Kelvin.

When both of the switches 210 are in the off state, the controller 215 causes the light emitting diode 155 to be on and the light emitting diode 150 to be off. Accordingly, the luminaire 100 emits illumination having a color temperature of 4,000 Kelvin.

When one of the switches 210 is in the off state and the other of the switches 210 is on the on state, the controller 215 causes the light emitting diode 155 to be on and the light emitting diode 150 to be on. The luminaire 100 thus emits illumination having a color temperature of 3,500 Kelvin. In some other example embodiments, the controller 215 can adjust the light output of one or both of the light emitting diodes 150, 155 to set the color temperature to a specific value with the range of 3,000 to 4,000 Kelvin.

Accordingly, the controller 215 maps the four configurations of the two switches 210 to three states for configuring the two light emitting diodes 150, 155 for permanent or long-term operation. Mapping two switch configurations to a single mode of long-term operation can simplify configuration instructions and reduce errors during field configuration. The resulting configurations support multiple color temperatures of illumination from a single luminaire 100.

Some example embodiments support fewer or more than three states of illumination. For example, in one embodiment, the luminaire 100 comprises three strings of light emitting diodes 150 that have different color temperatures, such as 3,000 Kelvin, 2,700 Kelvin, and 4,000 Kelvin. In this example, in addition to the states illustrated in FIG. 3 and discussed above, the switching logic can support a fourth state in which only the 2,700 Kelvin string is on.

FIG. 4 illustrates a schematic of an example embodiment of the circuit 200. The schematic of FIG. 4 provides one example implementation of the block diagram illustrated in FIG. 3.

As illustrated in FIG. 4 in schematic form, the circuit 200 conforms to the foregoing discussion of the block diagram format of FIG. 3. In FIG. 4, the light emitting diodes 150, 155 of FIG. 3 are respectively represented with groups of light emitting diodes 150, 155. Additionally, the schematic details include a thermal protective switch 305 for guarding against overheating. FIG. 4 thus provides one example schematic for an embodiment of the electrical system of the luminaire 100 illustrated in FIG. 1 and discussed above.

As will be appreciated by those of ordinary skill, the textual and illustrated disclosure provided herein supports a wide range of embodiments and implementations. In some non-limiting example embodiments of the disclosure, a luminaire can comprise: a housing; a substrate disposed in the housing; a first plurality of light emitting diodes that are mounted to the substrate and that have a first color temperature; a second plurality of light emitting diodes that are mounted to the substrate and that have a second color temperature; and a plurality of manual switches that are disposed at the housing for permanently configuring the luminaire to: provide illumination of the first color temperature by enabling the first plurality of light emitting diodes; provide illumination of the second color temperature by enabling the second plurality of light emitting diodes; and provide illumination of a third color temperature that is between the first color temperature and the second color temperature by enabling the first plurality of light emitting diodes and the second plurality of light emitting diodes.

In some example embodiments of the luminaire, the housing can comprise an aperture that is configured for emitting area illumination, and the substrate is oriented to emit light through the aperture. In some example embodiments of the luminaire, the plurality of manual switches are mounted to the substrate. In some example embodiments of the luminaire, the plurality of manual switches are mounted in the housing. In some example embodiments of the luminaire, the plurality of manual switches are mounted to the housing. In some example embodiments of the luminaire, the plurality of manual switches comprise a dual inline pin (DIP) switch. In some example embodiments of the luminaire, the plurality of manual switches provide two switch states, and each of the two switch states provides illumination of the third color temperature by enabling the first plurality of light emitting diodes and the second plurality of light emitting diodes. In some example embodiments of the luminaire, the housing is circular and comprises a lip configured for extending around an aperture in a ceiling. In some example embodiments of the luminaire, the housing comprises a wiring port disposed on a side of the housing. In some example embodiments of the luminaire, the housing comprises a light-emitting aperture in which the substrate is disposed. In some example embodiments, the luminaire further comprises: an aperture disposed at a lower side of the housing; a lens disposed at the aperture for refracting light emitted by the first and second light emitting diodes; and a reflector that is disposed between the lens and the light emitting diodes and that is operative to reflect light between the first and second light emitting diodes and the lens. In some example embodiments of the luminaire, the housing is circular and comprises a lip configured for extending around an aperture in a ceiling. In some example embodiments of the luminaire, the housing comprises a wiring port disposed on a side of the housing. In some example embodiments of the luminaire, the housing forms a cavity associated with the aperture. In some example embodiments of the luminaire, the first and second light source are mounted to a substrate that is disposed at an end of the cavity. In some example embodiments, the luminaire further comprises a reflector that is disposed in the cavity between the lens and the first and second light sources, the reflector operative to reflect light between the first and second light sources and the lens.

Technology for providing a configurable a luminaire has been described. Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of this application. Although specific terms are employed herein, they are used in a generic and descriptive sense only and not for purposes of limitation.

What is claimed is:

1. A luminaire comprising:
   a first set of light emitting diode (LED) light sources each having a first color temperature and a second set of LED light sources each having a second color temperature are both disposed in a cavity of the luminaire, wherein a third color temperature is produced from mixing the light emitted by at least a portion of the first set of LED light sources and at least a portion of the second set of LED light sources;
   at least one switch disposed on the luminaire, wherein the first set of LED light sources and second set of LED light sources are controlled by at least one switch;
   wherein when the at least one switch is in a first configuration, the light emitted by the luminaire is the third color temperature at a third lumen intensity, wherein the third lumen intensity is a combination of a first lumen intensity of at least a portion of the first set of LED light sources and a second lumen intensity of at least a portion of the second set of LED light sources; and
   wherein the third color temperature is based, at least in part, on the first lumen intensity being more than the second lumen intensity.

2. The luminaire of claim 1, wherein the at least one switch is accessible from the outside of the luminaire.

3. The luminaire of claim 2, wherein when the luminaire is installed in a ceiling aperture, the at least one switch is not accessible from below the ceiling.

4. The luminaire of claim 1, wherein the at least one switch includes a slide switch.

5. The luminaire of claim 1, wherein the third color temperature results from light from at least a portion of the first set of LED light sources and at least a portion of the second set of LED light sources mixing behind a lens of the luminaire, wherein the lens is positioned adjacent a lower light-emitting aperture of the luminaire.

6. The luminaire of claim 5, wherein at least one reflector is disposed in the luminaire adjacent the lens.

7. The luminaire of claim 1, wherein when the at least one switch is in a second configuration, the light emitted by the recessed luminaire is a fourth color temperature different than the first, second, and third color temperatures and in between the second and third color temperatures.

8. The luminaire of claim 7, wherein the fourth temperature is produced based, at least in part, on the second lumen intensity being more than the first lumen intensity.

9. The luminaire of claim 7, wherein the second color temperature is separated from the third color temperature by no less than 500 Kelvin.

10. The luminaire of claim 1, wherein the second set of LED light sources includes more LEDs emitting light than the first set of LED light sources.

11. The luminaire of claim 1, wherein an overall lumen output of the light emitted by the luminaire is capable of being adjusted by an external dimmer.

12. The luminaire of claim 1, further comprising: a controller in electrical communication with the at least one switch, wherein each of the first set of LED light sources and second set of LED light sources are controlled by the controller.

13. The luminaire of claim 12, wherein the controller sets the current provided to each of the first set of LED light sources and second set of LED light sources.

14. The luminaire of claim 12, wherein the controller includes digital logic for turning on and off a subset of light emitting diodes in each of the first set of LED light sources and second set of LED light sources.

15. The luminaire of claim 12, wherein the controller includes microprocessor-implemented logic with instructions stored in non-transitory memory.

* * * * *